United States Patent Office 3,106,565
Patented Oct. 8, 1963

3,106,565
ORGANOPHOSPHORUS ESTERS
Peter E. Newallis, Crestwood, Mo., assignor to Monsanto Chemical Company, St. Louis, Mo., a corporation of Delaware
No Drawing. Filed May 2, 1960, Ser. No. 25,823
6 Claims. (Cl. 260—332.1)

This invention relates to new and useful organophosphorus esters and to methods of making same. Additionally this invention relates to insecticidal compositions containing these esters as an active ingredient.

The organophosphorus esters of this invention are phosphorothioates and are characterized by a 1,1-dioxo-2,3-dihydrothienyl substituent and can be represented by the structure

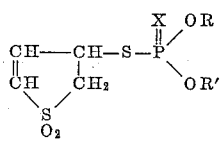

wherein X is a chalkogen of atomic weight less than 40 (i.e. sulfur or oxygen) and wherein R and R' are like or unlike alkyl radicals containing from 1 to 5 carbon atoms (e.g. methyl, ethyl, propyl, butyl, amyl, and the various isomeric forms thereof). It is preferred that R and R' be alkyl radicals containing not more than 2 carbon atoms (e.g. methyl, ethyl).

The phosphorothioates of this invention can be prepared by reacting in a fluid medium (i.e. a temperature above the freezing point of the system up to and including the system's boiling point but preferably in the range of 20° C. to 120° C.) a halide of the structure

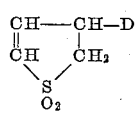

wherein D is a halogen having an atomic number above 9 but not higher than 35 (i.e. chlorine or bromine) with a substantially equimolar amount of a salt (i.e. ammonium or alkali metal such as sodium, potassium or lithium) of a phosphorothioic acid of the structure

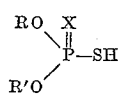

wherein R, R' and X have the aforedescribed significance in the presence of an inert organic liquid or solvent (e.g. benzene, toluene, xylene, acetone, butanone, dioxane, carbon tetrachloride, etc.).

As illustrative of the phosphorothioates of this invention are:

S-(1,1-dioxo-2,3-dihydrothien-3-yl) O,O-dimethyl phosphorothioate
S-(1,1-dioxo-2,3-dihydrothien-3-yl) O,O-dimethyl phosphorodithioate
S-(1,1-dioxo-2,3-dihydrothien-3-yl) O,O-diethyl phosphorothioate
S-(1,1-dioxo-2,3-dihydrothien-3-yl) O,O-diethyl phosphorodithioate
S-(1,1-dioxo-2,3-dihydrothien-3-yl) O,O-diisopropyl phosphorodithioate
S-(1,1-dioxo-2,3-dihydrothien-3-yl) O,O-diisobutyl phosphorodithioate
S-(1,1-dioxo-2,3-dihydrothien-3-yl) O,O-disoamyl phosphorothioate As illustrative of the preparation of the phosphorothioates of this invention is the following:

Example I

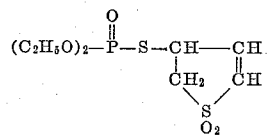

To a suitable reaction vessel equipped with a thermometer, agitator and reflux condenser is charged approximately 80 parts by weight of acetone and 15.4 parts by weight of 3-bromo-1,1-dioxo-2,3-dihydro-thiophene and to this mix is added 14.6 parts by weight of ammonium O,O-diethyl phosphorothioate dissolved in 160 parts by weight of acetone. The mass is heated with agitation at reflux for 3 hours. The reaction mass is then filtered and the filtrate subjected to vacuum distillation to remove the acetone. The residue is then taken up with methylene chloride and the organic solution washed first with 3% aqueous sodium carbonate and then with water. The so-washed organic solution is then subjected to vacuum distillation to remove the methylene dichloride and other volatiles. The residue, an amber liquid, is S-(1,1-dioxo-2,3-dihydrothien-3-yl) O,O-diethyl phosphorothioate which is soluble in benzene and chloroform but insoluble in water.

Example II

Employing the procedure of Example I but replacing ammonium O,O-diethyl phosphorothioate with an equimolar amount of ammonium O,O-diethyl phosphorodithioate there is obtained S-(1,1-dioxo-2,3-dihydrothien-3-yl) O,O-diethyl phosphorodithioate, an amber liquid, which is soluble in benzene and chloroform but insoluble in water.

Example III

Employing the procedure of Example I but replacing ammonium O,O-diethyl phosphorothioate with an equimolar amount of ammonium O,O-dimethyl phosphorodithioate there is obtained S-(1,1-dioxo-2,3-dihydrothien-3-yl) O,O-dimethyl phosphorodithioate, an amber oil which is soluble in benzene but insoluble in water.

Example IV

Employing the procedure of Example I but replacing ammonium O,O-diethyl phosphorothioate with an equimolar amount of ammonium O,O-diisopropyl phosphorodithioate there is obtained S-(1,1-dioxo-2,3-dihydrothien-3-yl) O,O-diisopropyl phosphorodithioate, an amber oil which is soluble in benzene and chloroform but insoluble in water.

The methods by which the phosphorothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for insecticidal purposes without further purification.

It will be understood that the terms "insect" and "insecticide" unless otherwise modified are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

The phosphorothioates of this invention are effective against a wide variety of insect pests. As illustrative of the activity but not limitative thereof is the following:

One gram of S-(1,1-dioxo-2,3-dihydrothien-3-yl) O,O-diethyl phosphorodithioate was dissolved in sufficient acetone to make a concentrate solution thereof. Approximate 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.1% by weight of S-(1,1-dioxo-2,3-dihydrothien-3-yl) O,O-diethyl phosphorodithioate. Thereupon lima bean plant leaves previously infested with the two spotted spider mite, *Tetranychus telarius* (L.), are dipped in the aqueous emulsion, withdrawn, and set aside for observation. At the end of 48 hours a 100% kill of the mobile stage of the mite is noted. Seven days after setting the test specimen aside residual activity is confirmed, a 100% kill of both the resting stage and the ova stage being noted. Similar results against the mobile, resting and ova stages of the same mite are obtained employing S-(1,1-dioxo-2,3-dihydrothien-3-yl) O,O-diisopropyl phosphorodithioate and S-(1,1-dioxo-2,3-dihydrothien-3-yl) O,O-diethyl phosphorothioate respectively, at the same concentration.

Residual activity is also observed employing the compounds of this invention against the adult red flour beetle, e.g. at a concentration of 1.0% by weight S-(1,1-dioxo-2,3-dihydrothien-3-yl) O,O-diethyl phosphorodithioate gave a 100% kill.

Employing S-(1,1-dioxo-2,3-dihydrothien-3-yl) O,O-diethyl phosphorodithioate at a concentration of 0.08 p.p.m. against yellow fever mosquito larvae, *Aëdes aegypti*, 100% kill is observed.

Systemic activity was also observed against a wide variety of insects. For example against the two spotted spider mite *Tetranychus telarius* (L.), a 100% kill is observed employing S-(1,1-dioxo-2,3-dihydrothien-3-yl) O,O-diethyl phosphorodithioate at a concentration of 0.01% by weight. Also for example against the Mexican bean bettle a 100% kill is observed employing S-(1,1-dioxo-2,3-dihydrothien-3-yl) O,O-diethyl phosphorothioate at a concentration of 0.004%.

Although the phosphorothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the phosphorothioates of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the phosphorothioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphorothioates of this invention employed in combatting or controlling insect pests can vary considerably provided the required dosage (i.e., toxic or lethal amount) thereof is supplied is supplied to the pests or to the environment of the pests. When the extending agent is a liquid or mixture of liquids (e.g. as in solutions, suspensions, emulsions, or aerosols) the concentration of the phosphorothioate employed to supply the desired dosage generally will be in the range of 0.001 to 50 percent by weight. When the extending agent is a semi-solid or solid, the concentration of the phosphorothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared insecticidal spray or particulate solid. In such a concentrate composition, the phosphorothioate generally will be present in a concentration of 5 to 95 percent by weight, the residue being any one or more of the well-known insecticidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphorothioates of this invention. For example, isopropyl ether, acetone, methyl ethyl ketone, dioxane, cyclo hexanone, carbon tetrachloride, ethylene dichloride, tetrachloroethane, hexane, heptane and the like higher liquid alkanes hydrogenated naphthalenes, solvent naphtha, benzene, toluene, xylene, petroleum fractions (e.g. those boiling almost entirely under 400° F., at atmoshperic pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphorothioates of this invention are to be supplied to the insect pests or to the environment of the pests as aerosols, it is convenient to disoslve them in a suitable solvent and disperse the resulting solution in dichlorodifluoromethane or like chlorofluoroalkane which boils below room temperature at atmospheric pressure.

The phosphorothioates of this invention are preferably supplied to the insect pests or to the environment of the insect pests in the form of emulsions or suspensions. Emulsions or suspensions are prepared by dispersing the phosphorothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphorothioates of this invention can be dispersed by suitable methods (e.g., tumbling or grinding) in solid extending agents either of organic or inorganic nature and supplied to the insect pest environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or, by addition of water-soluble surfactants or wetting agents, the dry particulate solids can be rendered wettable by water so as to obtain stable aqueous dispersions or suspensions suitable for use as sprays.

For special purposes the phosphorothioates of this invention can be dispersed in a semi-solid extending agent such as petrolatum or soap (e.g. sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphorothioates of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of S-(1,1-dioxo-2,3-dihydrothien-3-yl) O,O-diethyl phosphorodithioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphorothioate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of S-(1,1-dioxo-2,3-dihydrothien-3-yl) O,O-diethyl phosphorothioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for insecticidal purposes, the active ingredients can be one or more of the compounds of this invention. The compounds of this invention can also be advantageously employed in combination with other pesticides, including, for example, nematocides, bactericides, and herbicides. In this manner, it is possible to obtain mixtures which are effective against a wide variety of pests and other forms of noxious life.

In controlling or combatting insect pests the phosphorothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with the insect pests or attractable to the pests for habitational or sustenance or propagational purposes, in any conventional fashion which permits contact between the insect pests and the phosphorothioates of this invention. Such dispersing can be brought about by applying the phosphorothioates per se or sprays or particulate solid compositions containing same to a surface infested with the insect pests or attractable to the pests, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insectcidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. Phosphorothioates of the structure

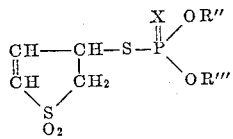

wherein X is selected from the group consisting of sulfur and oxygen and wherein R" and R"' are alkyl having 1 to 5 carbon atoms.

2. Phosphorothioates of the structure

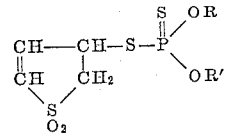

wherein R and R' are alkyl having not more than two carbon atoms.

3. S-(1,1-dioxo-2,3-dihydrothien-3-yl) O,O-diethyl phosphorothioate.

4. S-(1,1-dioxo-2,3-dihydrothien-3-yl) O,O-diethyl phosphorodithioate.

5. S-(1,1-dioxo-2,3-dihydrothien-3-yl) O,O-dimethyl phosphorodithioate.

6. S-(1,1-dioxo-2,3-dihydrothien-3-yl) O,O-diisopropyl phosphorodithioate.

References Cited in the file of this patent
UNITED STATES PATENTS

| | | |
|---|---|---|
| 2,393,925 | Morris et al. | Jan. 29, 1946 |
| 2,758,955 | Johnson et al. | Aug. 14, 1956 |
| 2,766,166 | Haubein | Oct. 9, 1956 |
| 2,844,582 | Raley | July 22, 1958 |
| 2,864,826 | Diveley | Dec. 16, 1958 |
| 2,882,278 | McConnell et al. | Apr. 14, 1959 |
| 2,957,887 | Berkey et al. | Oct. 25, 1960 |